United States Patent
Mansi et al.

(10) Patent No.: US 12,453,985 B2
(45) Date of Patent: Oct. 28, 2025

(54) METHOD OF COATING A SUBSTRATE BY ELECTRON BEAM CURING

(71) Applicant: LAMBERTI SPA, Albizzate (IT)

(72) Inventors: Silvia Mansi, Varese (IT); Domenico Vetri, Gallarate (IT); Thomas Gallo, Gallarate (IT); Daria Diamante, Varese (IT); Mariuccia De Luca, Lonate Pozzolo (IT); Stefano Fumagalli, Carnago (IT); Giovanni Floridi, Novara (IT); Giuseppe Li Bassi, Gavirate (IT)

(73) Assignee: LAMBERTI SPA, Albizzate (IT)

( * ) Notice: Subject to any disclaimer, the term of this patent is extended or adjusted under 35 U.S.C. 154(b) by 691 days.

(21) Appl. No.: 17/793,335

(22) PCT Filed: Jan. 28, 2021

(86) PCT No.: PCT/EP2021/052015
§ 371 (c)(1),
(2) Date: Jul. 15, 2022

(87) PCT Pub. No.: WO2021/152031
PCT Pub. Date: Aug. 5, 2021

(65) Prior Publication Data
US 2023/0103310 A1    Apr. 6, 2023

(30) Foreign Application Priority Data
Jan. 31, 2020   (IT) .................. 102020000001963

(51) Int. Cl.
*B05D 3/06* (2006.01)
*B05D 3/02* (2006.01)
*C09D 11/30* (2014.01)
*C09D 175/04* (2006.01)

(52) U.S. Cl.
CPC ............ *B05D 3/068* (2013.01); *B05D 3/0254* (2013.01); *B05D 2202/00* (2013.01); *B05D 2203/35* (2013.01); *B05D 2503/00* (2013.01); *C09D 11/30* (2013.01); *C09D 175/04* (2013.01)

(58) Field of Classification Search
CPC ............... B05D 3/068; B05D 2503/00; B05D 2520/00; B05D 2202/00; B05D 2203/35
USPC ........................................ 427/496, 551, 595
See application file for complete search history.

(56) References Cited

U.S. PATENT DOCUMENTS

| | | |
|---|---|---|
| 2004/0254293 A1 | 12/2004 | Killilea et al. |
| 2008/0257216 A1 | 10/2008 | Ravyst |
| 2015/0275041 A1* | 10/2015 | Tielemans ............ B29C 64/124 427/508 |

FOREIGN PATENT DOCUMENTS

| | | |
|---|---|---|
| EP | 1845143 A1 | 10/2007 |
| EP | 2143748 A1 | 1/2010 |
| EP | 2233540 A1 | 9/2010 |
| WO | 2016164220 A1 | 10/2016 |
| WO | 2018138492 A1 | 8/2018 |

OTHER PUBLICATIONS

Written Opinion and International Search report for corresponding PCT application No. PCT/EP2021/052015 mailed Apr. 30, 2021.

* cited by examiner

*Primary Examiner* — William P Fletcher, III
(74) *Attorney, Agent, or Firm* — Vorys, Sater, Seymour and Pease, LLP

(57) ABSTRACT

Method of coating a substrate comprising the steps of: i) applying to the substrate a radiation curable aqueous composition comprising a dispersed polymeric binder, ii) thermally drying the aqueous coating composition and iii) electron beam curing the coating composition, the method being characterized by the fact that the aqueous coating composition is a physically drying, film-forming aqueous composition and that the curing is performed in air atmosphere.

20 Claims, No Drawings

METHOD OF COATING A SUBSTRATE BY ELECTRON BEAM CURING

FIELD OF THE INVENTION

The present invention relates to a method of coating a substrate by applying to it a physically drying, film-forming radiation curable aqueous composition comprising a dispersed, polymeric binder and electron beam curing the aqueous composition in air atmosphere.

STATE OF THE ART

Curing of monomers, oligomers or polymers by means of radiation represents a widely spread technique that is largely replacing the use of conventional solvent based, and even of aqueous borne, thermally cured, coatings.

Radiation-cured coatings offer a manufacturer several important features, such as rapid cure speeds, elimination of solvents, low energy curing costs, ability to cure a variety of substrates including heat-sensitive substrates such as plastics and paper, increased productivity, reduced storing space in the production facility.

The main sources of energy for curing coatings by radiation are electron beam (EB) and ultraviolet light (UV light).

The UV light curing process needs the combination of at least two components: the polymerizable compounds (typically but not exclusively unsaturated organic moieties) and the photoinitiator (PI).

The main drawbacks of UV light curing process are the persistence of the photoinitiators residues in the coating—that although PIs are used in minor amounts, may be of toxicological concern—and its poor efficacy for curing relatively thick layers of coatings, especially in case of black, opaque, metallic or generally pigmented coatings, because of poor penetration of the light therein.

EB curing does not need PIs and is also suited for the curing of thick and pigmented coatings and has gained therefore attention and segments of market especially for the coating of food packaging and of porous and heat sensitive substrates, such as paper.

Moreover, EB can penetrate through "non curable" organic or inorganic layers, like plastics or metals, due to the penetration capacity of the electrons.

High investment costs, even if declining, and the need of inerting the reaction chamber with nitrogen are two important drawbacks of EB curing that still need to be remedied.

Both UV and EB generated free radicals are inhibited by atmospheric oxygen, but because of high surface irradiance in UV curing, UV formulations may be designed to cure in air atmosphere.

Differently, while EB laminating allows to cure in air, because the layers protect the adhesive composition contained between them, EB curing of coatings and inks necessitates that the process zone is de-aerated to almost completely displace the atmospheric oxygen in the reaction chamber and to exclude oxygen inhibition; less than 200 ppm of oxygen is the typical admitted oxygen operative concentration. Inertization is most commonly achieved with nitrogen gas, as reported, by way of example, in "Electron Beam Curing Properties of Waterborne Monomer and Polymer Materials", by Stephen C. Lapin at al., and "Advances in Electron Beam Curing in Wide Web Flexible Package Printing", by David A. Biro et al., both in RadTech 2016 Conference Proceedings; "New generation EB equipment—Lowering Customers' Operating Costs", by Urs Lauppi and Imitiaz Rangwalla in Radtech Report April-June 2010, p. 19-24; "Comparison of UV and EB Technology for printing and packaging Applications", by Stephen C. Lapin, in Radtech Report September-October 2008, p. 27-35; U.S. Pat. No. 5,120,972; WO 97/19763.

Although optimized inerting systems, such as those described in U.S. Pat. No. 5,120,972, have been developed, inertization still represents a significant percentage of the operating costs of an EB curing line.

This is especially relevant for coatings applied on three-dimensional objects that needs large reaction chambers and large volumes of purging nitrogen.

EB coatings are based on the free-radical polymerization of monomers, oligomers and polymers that are typically acrylate-functionalized.

Beside the traditional, water-free acrylate monomers or oligomers with relatively low molecular weight that have been used since the beginning of EB and UV curing technology, in more recent years, water based solutions, emulsions or dispersions of radiation curable compositions comprising polymeric binders and water soluble or water dispersible polyfunctional acrylic monomers and oligomers have been introduced on the market, to enhance the properties of the final film, to reduce the viscosity of the initial coating composition and especially to reduce as much as possible the health concerns derivable from handling low molecular weight acrylates.

Polymeric binders of such radiation curable compositions are typically polyacrylates, polyurethanes, polyurethane-polyacrylate copolymers and acrylated polyurethanes.

By way of example, in the literature, a great variety of acrylated polyurethanes has been described that are especially suggested for use in UV curing or generically for radiation curing; we cite, as example, EP 870788 (Solutia Austria GmbH), EP 2581396 and EP 2468782 (Allnex), EP 3083736 (DSM IP Assets B.V.), EP 2581397 (Bayer), EP 3058008 (BASF).

Acrylated polyurethanes contain radiation curable acrylic groups that when exposed to radiation self-crosslink or undergo polymerization with water soluble or water dispersible or water emulsifiable polyfunctional acrylic monomers and oligomers, if present, thus increasing the resistance of the final coating.

Few documents are specifically directed to acrylated polyurethanes developed for EB curing.

Among them we cite U.S. Pat. No. 5,028,683 (3M Co.), directed to non-aqueous, acrylated polyurethanes bearing internal acrylic groups, useful for the production of magnetic recording media, and EP 107608, directed to non-aqueous, acrylated polyurethanes bearing terminal acrylic groups useful in cast master batches for the production of strips for tire.

U.S. Pat. No. 7,037,953 relates to homogeneous aqueous compositions comprising water soluble radiation polymerizable compounds that can be applied and directly cured by electron beam without any substantial removal of water. The radiation polymerizable compound may be a water-soluble polyurethane acrylate.

The use of non-reactive polymeric binders in radiation curable compositions is also practised in the field, when reactive diluents are present in the compositions. EP 1869097 discloses energy curable aqueous compositions comprising an ethylenically unsaturated oligomer and a water dispersible resin not containing energy curable functional groups, which is preferably a polyurethane-urea copolymer. The compositions are said to be irradiated with the water of the formula in place; EB curing is performed under nitrogen.

WO 2016/164220 relates to electron beam curing of water based ink jet inks that "may" comprise any water soluble and/or dispersible EB polymerizable and/or crosslinkable monomers, oligomers, and/or polymers (p. 5, l. 16-18); its materials are "effectively dried by EB exposure alone with little or no added heat" (p. 5, l. 8-10; Examples 1 and 2). Although it reports that an inert gas "may" be used during EB to displace oxygen that inhibits free-radical polymerization, WO 2016/164220 is silent about which are the characteristics of the coating composition that allow curing without inertization. The fact that "the amount of inerting needed for curing may be reduced due to the simultaneous emission of water vapor from the ink layer which helps to displace oxygen" further suggests that drying the film before irradiation (thermal drying) would indeed increase the need for inertization to low oxygen levels.

It has now been found that radiation curable, physically drying, film-forming aqueous coating compositions comprising certain dispersed polymeric binders can be successfully cured by electron beam in air atmosphere after being subjected to thermal drying, to provide coatings with excellent chemical resistance to rubs, stain, corrosion, solvents and caustic aqueous media.

SUMMARY

The fundamental object of the present invention is a method for coating a substrate comprising the steps of:
i) applying to the substrate from 0.1 to 250 g/m² (dry matter), preferably from 0.5 to 80 g/m² (dry matter), most preferably from 0.5 to 40 g/m² (dry matter), of a radiation curable aqueous composition comprising from 15 to 50 wt %, preferably from 20 to 40 wt %, of a dispersed polymeric binder and from 0 to 15 wt %, preferably from 1 to 10 wt %, of an unsaturated reactive diluent,
ii) thermally drying the aqueous composition and
iii) electron beam curing the thermally dried composition, the method being characterized by the fact that the aqueous composition is a physically drying, film-forming aqueous composition containing from 100 to 600 meq/100 g (dry matter) of radiation curable unsaturated groups and that the curing is performed in air atmosphere.

DETAILED DESCRIPTION

The radiation curable aqueous coating composition is a physically drying, film-forming composition.

By "physically drying, film-forming composition" we mean a composition that forms a dust-free (non-dusty) film upon the thermal drying of step ii), and before the electron beam curing of step iii) takes place.

A film is considered "dust-free" when it does not retain on its surface absorbent cotton fibres that have been dropped on its surface, after blowing lightly, according to the standard test method ASTM D1640/D1640M-14 (2018).

Without being bound by any theory, after drying, the dust-free film produced by the aqueous composition might protect the inner layer of the dried composition from oxygen diffusion and be essential for allowing the curing in air atmosphere, while providing cling sites for the unsaturated reactive diluents, if present, and crosslinking through the curable functionalities.

Aqueous dispersions of polymeric binders useful for preparing the physically drying, film-forming aqueous coating compositions are commercially available and are those capable of forming by themselves a dust-free film upon drying, even in the presence of controlled amounts of unsaturated reactive diluents and of minor additives that may be present within the dispersion or in the curable aqueous coating composition.

Preferably, the radiation curable aqueous composition forms a tack-free film (according to ASTM D1640) upon the thermal drying of step ii), and before the electron beam curing of step iii) takes place.

Most preferably, the radiation curable aqueous composition forms a "dry-hard" film upon the thermal drying of step ii), and before the electron beam curing of step iii) takes place.

A film is considered "dry-hard" when no marks are left on its surface by thumb pressure, according to par. 7.6.1 of ASTM D1640.

Aqueous dispersions of polymeric binders useful for preparing the preferred aqueous compositions are commercially available and are those capable of forming by themselves a tack-free, more preferably dry-hard film, upon drying, even in the presence of controlled amounts of unsaturated reactive diluents and of minor additives that may be present in the radiation curable aqueous composition.

An essential ingredient of the radiation curable aqueous compositions that are needed for implementing the method for coating above described is thus the dispersed polymeric binder.

A mixture of dispersed polymeric binders may be used in the method.

The dispersed polymeric binder may be saturated, i.e. it does not contain any radiation curable carbon-carbon double bond, and is a polyurethane, polyacrylate or polyacrylate-polyurethane copolymer; in this embodiment, the radiation curable composition contain from about 4 to about 10 wt % of one or more radiation curable unsaturated reactive diluent.

In a preferred embodiment the dispersed polymeric binder is a polyurethane binder. In a more preferred embodiment, the dispersed polymeric binder is a polyurethane binder that contains from 10 to 300 meq/100 g, even more preferably from 20 to 250 meq/100 g (dry matter), of radiation curable carbon-carbon double bonds; in a most preferred embodiment the radiation curable polyurethane binder contains from 20 to 150 meq/100 g (dry matter) of radiation curable carbon-carbon double bonds, typically of acrylic groups.

The amount of radiation curable carbon-carbon double bonds, expressed in meq/100 g, may be determined from the iodine number as determined by the Standard Test Method ASTM D1541-97 by potentiometric titration.

In the present text, the term acrylate is used to mean both acrylate and methacrylate. The wording (meth)acryl- is to be read as acryl- or methacryl-.

The useful radiation curable polyurethane binders may be synthesized by conventional techniques, typically through prepolymer synthesis in anhydrous environment followed by chain extension in water as medium. They are also available on the market.

More particularly, the radiation curable polyurethane binder may be prepared by:
A) reacting a) from 3 to 10 wt % of a diol containing water dispersing groups, preferably ionic or potentially ionic water dispersing groups, more preferably anionic or potentially anionic water dispersing groups, b) from 20 to 60 wt % of a nonionic polyether diol, polyester diol, or polycarbonate diol having a molecular weight of from 500 to 5000, preferably from 800 to 4000, more preferably from 1000 to 3000, c) from 10 to 30 wt % of a compound containing one or more groups, preferably one or two, more preferably one group, that are able to react with isocyanate groups and from one to five, preferably one to three, radiation curable carbon-carbon double bonds, preferably acrylic groups, with d) from 30 to 50 wt % of organic diisocyanates, to obtain a prepolymer containing from 0 to 10 wt %, preferably from 2 to 6 wt %, of free isocyanate groups; B) dispersing the prepolymer in water; C) optionally, chain extending the prepolymer in water with a chain extender, to obtain the radiation curable polyurethane in aqueous dispersion.

Additional minor components that may take part in the polyurethane synthesis are detailed here below.

The diol a) may be non-ionic and impart water-dispersibility by means of its hydrophilic character, usually determined by the presence of polyethoxylated segments in its structure.

Nonetheless, ionic or potentially ionic water dispersing groups are preferred; diols a) containing water-compatible anionic or potentially anionic water dispersing groups are particularly preferred.

The diol containing ionic or potentially ionic water dispersing group a) typically has molecular weight of from 100 to 500 g/mol. The amount of diol a) relative to the total amount of components used to prepare the prepolymer is from 3 to 10 wt %, preferably from 4 to 8 wt % and even more preferably from 5 to 7 wt %.

Among the preferred anionic or potentially anionic groups, carboxylic, phosphoric and sulfonic groups are preferred, carboxylic groups are especially preferred.

Cationic water dispersible groups can also be used, but are less preferred. Particularly preferred diols a) are carboxyl containing diols, for example dihydroxy alkanoic acids such as 2,2-dimethylol propionic acid (DMPA) or 2,2-dimethylolbutanoic acid (DMBA). The anionic water dispersing groups are preferably fully or partially in the form of a salt. Conversion to the salt form is typically effected by neutralisation with a base, preferably during the preparation of the polyurethane prepolymer or during the preparation of the polyurethane dispersion or the aqueous composition. The base is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide.

The amount of diol a) is determined to provide water dispersibility to the prepolymer that is obtained after completion of step A), according to what is well known in the art.

Typically, dispersibility is achieved by introducing an amount of diol a) such that the prepolymer contains from 5 to 75, preferably from 20 to 60, meq/100 g (dry matter) of carboxylic groups (as —COOH).

As component b), nonionic polyether diols, polyester diols and polycarbonate diols, or mixtures thereof, may be used.

Among the utilizable polyester diols are those obtained, for example, by reacting dicarboxylic acids, or possibly the corresponding anhydrides or methyl esters, with diols, optionally in the presence of known esterification catalysts.

Examples of suitable acids or anhydrides include adipic acid, succinic acid, maleic acid, sebacic acid, azelaic acids, the various commercially available dimeric fatty acids in saturated (hydrogenated) or unsaturated form, phthalic acid, isophthalic acid, tetrahydrophthalic acid, 1,4-cyclohexanedicarboxylic acid and hexahydrophthalic acid; adipic acid, succinic acid, maleic acid, sebacic acid and azelaic acids are preferred.

Suitable diols for the preparation of the polyester diols are, for example, ethylene glycol, 1,2- and 1,3-propanediol, 1,3- and 1,4-butanediol, 1,6-hexanediol, 3-methyl-1,5-pentanediol, 1,5-pentanediol, cyclohexanedimethanol, diethylene glycol, dipropylene glycol, neopentyl glycol and mixtures thereof, such as mixtures of 1,6-hexanediol and 1,5-pentanediol or of 1,6-hexanediol and neopentyl glycol.

Other useful polyester diols are those obtainable from diol-initiated polymerization of hydroxy carboxylic acids containing from 2 to 26, and preferably from 4 to 12 carbon atoms, or a lactone thereof. The hydroxy carboxylic acids may be saturated or unsaturated, linear or branched.

Examples of suitable hydroxy carboxylic acids are glycolic acid, lactic acid, 5-hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid and 4-hydroxydecanoic acid.

Examples of suitable lactones are β-propiolactone and, optionally $C_1$-$C_6$-alkyl substituted, δ-valerolactone and ε-caprolactone, such as β-methyl-δ-valerolactone. Polyester diols obtained from ε-caprolactone are especially preferred.

Useful polyether diols include products obtained by the polymerization of cyclic oxides, for example ethylene oxide, propylene oxide, butylene oxide, tetrahydrofuran, ethoxylated polyether-1,3-diols, and mixture thereof. Especially useful polyether diols include polyoxypropylene diol, poly(oxyethylene-oxypropylene) diol and poly(tetramethylene glycol)diol.

The preferred polyether diol is poly(tetramethylene glycol)diol. The polycarbonate diols are those obtained, for example, by reacting carbonic acid derivatives, such as diphenyl carbonate or phosgene, and diols.

Suitable diols include those mentioned above for the preparation of the polyester diols.

The preferred polycarbonate diol is 1,6-hexanediol polycarbonate.

Mixtures of different diols may be used as components b). Polyether diols and polycarbonate diols, and especially polycarbonate diols, are preferred.

The molecular weight of the polymeric diols b) is calculated from the hydroxyl number.

Beside the diols b), low molecular weight diols, here designated diols b'), can be used in step A), preferably in amount not exceeding 5% by weight on the prepolymer. By low molecular weight diols we mean diols having molecular weight from 62 to 499, preferably from 90 to 300 and especially from 90 to 144 daltons.

Examples of low molecular weight diols that can be used in step A) are 1,4-cyclohexanedimethanol, 1,2-propanediol, 1,3-propanediol, 1,2-ethanediol, 1,4-butanediol, 1,6-hexanediol, 2,2-dimethyl-1,3-propandiol, mixtures thereof.

The component c) is made of compounds containing one or more groups, preferably one or two groups, more preferably one group, that are able to react with isocyanate groups and from one to five, preferably one to three, more preferably one, radiation curable carbon-carbon double bonds, preferably acrylic groups.

Among the groups that are able to react with isocyanate groups are hydroxyl groups, primary and secondary amino groups and thio groups. Hydroxyl groups are preferred in component c).

Most preferably, component c) is made of compounds containing one group that is able to react with isocyanate groups, especially one hydroxyl group, and one or three, especially one, acrylic groups.

More generally, component (c) may be made of partial esters of (meth)acrylic acid with di- or polyols preferably having 2 to 20 carbon atoms, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, neopentylglycol, 1,5-pentanediol, 1,6-hexanediol, trimethylolpropane, trimethylolbutane, pentaerythritol, dipentaerythritol, ditrimethylolpropane, erythritol, sorbitol.

In addition, it is also possible to use esters or amides of (meth)acrylic acid with amino alcohols, examples being 2-aminoethanol, 2-(methylamino)ethanol, 3-amino-1-propanol, 1-amino-2-propanol or 2-(2-aminoethoxy)ethanol. Preference is given to using 2-hydroxyethyl (meth)acrylate, 2- or 3-hydroxypropyl(meth)acrylate, 1,4-butanediol mono(meth)acrylate, neopentyl glycol mono(meth)acrylate, 1,5-pentanediol mono(meth)acrylate, 1,6-hexanediol mono(meth)acrylate, trimethylolpropane di(meth)acrylate, pentaerythrityl tri(meth)acrylate.

2-hydroxyethyl (meth)acrylate and pentaerythrityl tri (meth)acrylate are particularly preferred.

Component c) may be made of technical grade mixtures from the (meth)acrylation of trimethylolpropane, pentaerythritol, ditrimethylolpropane or dipentaerythritol. These are usually mixtures of completely and incompletely (meth)acrylated polyols, preferably with an average of about one non esterified hydroxy group.

Technical grade mixtures of pentaerythrityl triacrylate that comprise minor amounts of pentaerythrityl tetraacrylate and pentaerythrityl diacrylate, and have averagely about one hydroxy group per molecule are also particularly preferred.

The organic diisocyanates that can be used as component d) are aromatic, aliphatic or cycloaliphatic.

Examples of diisocyanates that can be used in step A) are 1,6-hexamethylene diisocyanate (HDI), isophorone diisocyanate (IPDI), 4,4'-dicyclohexylmethane diisocyanate (HMDI), 2-methyl pentane 1,5-diisocyanate, hydrogenated 2,4-toluene diisocyanate, hydrogenated 2,6-toluene diisocyanate, 3(4)-isocyanatomethyl-1-methyl cyclohexyl isocyanate (IMCI), 2,4-toluene diisocyanate, 2,6-toluene diisocyanate, and mixtures thereof.

Preferably the diisocyanates are aliphatic or cycloaliphatic and are chosen among 4,4'-dicyclohexyl methanediisocyanate, 1-isocyanate-3-isocyanatemethyl-3,5,5-trimethylcyclohexane (or isophorone diisocyanate), hexamethylene diisocyanate and mixtures thereof.

Beside the organic diisocyanates, from 0.1 to 15 wt %, preferably from 0.5 to 15 wt %, more preferably from 3 to 14 wt % of organic polyisocyanates (with average isocyanate functionality higher than two) may be used in step A) as component e). Polyisocyanates that can be used as components e) may be diisocyanate trimers such as isocyanurates, iminooxadiazinediones and biuret trimers that are obtained from the self-condensation of organic diisocyanates, as described for example in DE 19611849 (Bayer AG).

Typically, they are obtained from the self-condensation of the following diisocyanates: 1,6-hexamethylenediisocyanate (HDI), isophorone diisocyanate (IPDI), 4,4'-dicyclohexylmethane diisocyanate (HMDI), toluene diisocyanate (TDI), 4,4'-diphenylmethane diisocyanate (MDI) and mixtures thereof.

The preferred diisocyanate trimers are the isocyanurate, the iminooxadiazinedione and biuret trimers of aliphatic or cycloaliphatic diisocyanates.

Diisocyanate trimers are commercially available, by way of example under the trade names Desmodur® N 3900, Desmodur® N 3600, Desmodur® N 3800, Desmodur® N 3790 and Desmodur® N 3400 from Bayer MaterialScience.

The diisocyanate trimers that can be used as component e) have NCO functionality from 2.1 to 4.0, preferably from 2.8 to 3.6, more preferably from 3.0 to 3.4. Other minor optional components that may be reacted in step A) are saturated compounds having one hydroxyl group or one primary or secondary amino group and preferably having molecular weight from 32 to 200 dalton, more preferably from 60 to 130 dalton; they may optionally be reacted as components f), in an amount comprised between 0.1 and 5 wt % on the prepolymer weight; they are typically monoalcohols, such as butyl alcohol, isopropyl alcohol, isoamyl alcohol, or secondary amines, such as dibutylamine.

The reaction of step A) may take place in the presence of a solvent or with the neat reactants at temperatures from 15 to 200° C., preferably at temperatures from 50 to 100° C.

The solvent, if present in step A), shall be chosen among solvents that are not reactive toward the isocyanate groups.

Examples of solvents that can be used in step A) are solvents having low boiling point such as methyl ethyl ketone (MEK), ethyl acetate and acetone, or high boiling solvents such as N-methylpyrrolidone, dipropylene glycol dimethyl ether, propyleneglycol monomethyl ether acetate, dipropyleneglycol monomethyl ether acetate, propyleneglycol diacetate, diethyleneglycol monobutyl ether acetate. The low boiling solvent, if present, is preferably removed by evaporation after dispersion in water of the prepolymer.

The completion of the reaction of step A) may be monitored by measuring the —NCO content, according to the ASTM D2572-19 method, until the expected—NCO content is reached.

In the reaction of step A) the ratio between the isocyanate groups and hydroxyl groups is typically between 1.0 and 3.0, preferably from 1.3 to 2.0, more preferably from 1.4 to 1.8.

In optional step C) the residual isocyanate groups, if any, are reacted in water with a chain extender that for example can be an amino-alcohol, a primary or secondary diamine or polyamine, hydrazine, a substituted hydrazine, at temperature of 20-30° C.; preferably, the chain extender is a polyamine, diamine or hydrazine, more preferably it is a diamine.

If no isocyanate groups are present after step A), the prepolymer in step B) is only physically dispersed in water.

Preferably, the prepolymer after step A) contains from 2% to 6% by weight of isocyanate groups that are reacted in step C) with a chain extender (other than water).

Specific examples of chain extenders that can be used are ethylene diamine, diethylene triamine, triethylene tetramine, propylene diamine, butylene diamine, hexamethylene diamine, cyclohexylene diamine, piperazine, 2-methyl piperazine, phenylene diamine, toluylene diamine, xylylene diamine, tri(2-aminoethyl) amine, methane diamine, m-xylene diamine, isophorone diamines. Also hydrazine (e.g. in the form of its mono-hydrate), azines such as acetone azine, substituted hydrazines such as, for example, dimethyl hydrazine, 1,6-hexamethylene-bis-hydrazine, carbodihydrazine, dihydrazides of dicarboxylic acids and sulphonic acids such as adipic acid dihydrazide can be used. Another suitable class of chain extenders is the so-called Jeffamine® compounds with a functionality of 2 or 3 (available from Huntsman. These are polypropylene oxide (PPO) or PEO-based di- or triamines, e.g. Jeffamine® T403 and Jeffamine® D-400.

Anionic chain extender, such as the sodium salt of 2-[(2-aminoethyl)amino]ethanesulfonic acid may also be used.

The chain extender may be added to the aqueous dispersion of the isocyanate-terminated prepolymer or, alternatively, it may already be present in the aqueous medium when the isocyanate-terminated prepolymer is dispersed therein. The chain extender is preferably used in about a stoechiometric amount.

Typically, in the final aqueous dispersion the content of polyurethane binder is from 15 to 50% by weight.

Where an unsaturated reactive diluent, i.e. a radiation curable unsaturated diluent, is present in the aqueous composition, preferably the reaction of step A) takes place in the presence of all or part of it, more preferably in the presence of from 1 to 10 wt % of it, based on the weight of the final aqueous composition.

Otherwise, the unsaturated reactive diluent may be added subsequently.

The unsaturated reactive diluent is a liquid, low viscous compound that contains radiation curable groups, preferably (meth)acrylic groups, and no groups that react with the isocyanate groups. It preferably has a Brookfield® viscosity below 150 mPa*s at 25° C.

A mixture of different unsaturated reactive diluents may be used.

Examples of mono-unsaturated reactive diluents are, for example, esters of (meth)acrylic acid with alcohols having 1 to 20 carbon atoms, examples being methyl (meth)acrylate, ethyl (meth)acrylate, butyl (meth)acrylate, 2-ethylhexyl (meth)acrylate, vinyl esters, e.g. vinyl acetate, vinyl propionate, cyclic monounsaturated compounds, e.g. N-vinylformamide, monoethylenically unsaturated carboxylic acids having 3 to 8 carbon atoms and water-soluble alkali metal, alkaline earth metal or ammonium salts thereof, for example acrylic acid, methacrylic acid, crotonic acid, fumaric acid, itaconic acid, maleic acid, N-vinylpyrrolidone, N-vinyllactams such as N-vinylcaprolactam, N vinyl-N-alkylcarboxamides or N-vinylcarboxamides, such as N-vinylacetamide, N-vinyl-N-methylformamide, and N-vinyl-N-methylacetamide, or vinyl ethers, examples being methyl vinyl ether, ethyl vinyl ether, n-propyl vinyl ether, isopropyl vinyl ether, n-butyl vinyl ether, sec-butyl vinyl ether, isobutyl vinyl ether, ter-butyl vinyl ether, and mixtures thereof.

Examples of unsaturated reactive diluents having at least two free-radically polymerizable C=C double bonds are especially the diesters and polyesters of α,β-ethylenically unsaturated mono- and/or dicarboxylic acids, such as acrylic and methacrylic acid, with diols or polyols.

Preferably, the unsaturated reactive diluent is chosen among trimethylolpropane triacrylate, hexanediol diacrylate, hexanediol dimethacrylate, pentaerythrityl tetraacrylate, dipentaerythrityl hexaacrylate. Most preferably, it is pentaerythrityl tetraacrylate, trimethylolpropane triacrylate or a mixture thereof.

Esters of alkoxylated polyols with α,β-ethylenically unsaturated mono- and/or dicarboxylic acids, for example the poly(meth)acrylates of alkoxylated trimethylolpropane, glycerol or pentaerythritol, and also of diethylene glycol, triethylene glycol, dipropylene glycol or tripropylene glycol may also be used. Additionally esters of alicyclic diols, such as cyclohexanediol di(meth)acrylate and bis(hydroxymethyl ethyl) cyclohexanedi(meth)acrylate may be used.

The radiation curable aqueous composition contains from 100 to 600 meq/100 g (dry matter) of radiation curable unsaturated groups; in a preferred embodiment the aqueous composition contains from 250 to 600 meq/100 g (dry matter) of radiation curable unsaturated groups. In another preferred embodiment it contains from 200 to 400 meq/100 g (dry matter) of radiation curable unsaturated groups.

The radiation curable aqueous compositions may contain conventional additives, such as surfactants, pigments or colorants, levelling agents, coalescing agents and rheology modifiers.

According to an advantageous embodiment, the aqueous compositions contains pigments or colorants.

The presence of additives that migrate to the surface of the coating layer during the drying step may be advantageous as long as it contributes to inhibit the penetration of oxygen in the film. Examples of such additives are waxes, silicones, silica, matting agents.

Other additives that may be used in the aqueous coating composition to further reduce the effect of oxygen are hydrogen donors, reducing agents, $CO_2$ producers, $O_2$ scavengers.

In step i) of the method, the application of the radiation curable composition to the substrate can be effected in any known manner, for example by spreading (e.g., with paint pad, or by brushing or rolling or knifecoating), spraying (e.g., air-fed spray, airless spray, hot spray, and electrostatic spray), troweling, flow coating (e.g., pouring, dipping, curtain coating, roller coating, and reverse roller coating), and electrodeposition.

In a preferred embodiment, the aqueous composition is pigmented or coloured and is an ink that may be applied by any suitable printing technique, but especially by ink jet; or the aqueous composition is an overprint varnish.

The method here described is suitable for coating various substrates including glass, metal, wood, paper, wood decoration paper, dry wall, and synthetic materials (such as plastics including elastomeric substrates), PVC flooring, ceramic, concrete, plaster board, gypsum-board, mortar, brick, and the like.

The method is particularly useful for coating substrates made of glass or metal, and especially in coil coating operations. In this operation a coil of a suitable metal substrate (metal foil, e.g., aluminium or steel sheet metal) is first coated with the composition of the present invention (on one or both sides), dried and cured.

The radiation curable aqueous compositions are applied to the substrate to be coated in the desired thickness.

The coating thickness is generally applied in a range from about 0.1 to 250 g/m$^2$ and preferably from 0.5 to 80 g/m$^2$ (dry matter).

According to an advantageous embodiment, the substrate to be coated is a three-dimensional object that, because of its extended form, require a large EB curing chamber where replacing nitrogen or other inerting gas with air atmosphere has a favourable and remarkable impact on the operating costs.

In step ii) of the method, the volatile constituents from the compositions are thermally removed, i.e. by heating or simple prolonged evaporation at room temperature.

Advantageously, the drying step takes place at temperature from 40 to 150° C. for a length of time that is strictly related to the thickness and the drying method and typically varies from 2 to 15 minutes.

These operations (application and drying) may be repeated once or optionally more than once, before electron beam curing.

In step iii), electron beam curing is performed with conventional apparatus, in air atmosphere, i.e. excluding the customary inertization that normally reduces the oxygen concentration in the process zone to 150-200 ppm.

Typically, the EB electrons have an energy between about 50 and about 300 kV electrons and preferably between 80 and 180 kV electrons. The dosage of high energy electron ranges from about 2 to about 20 megarads (Mrads); and preferably from 5 to 15 Mrads.

The hardness of the final coating is mainly dependent upon the chemical nature of the polymeric binder, being influenced by the presence of the amount of hard and soft segments, of crosslinkable sites or branching, as the skilled person knows.

Generally Konig hardness between 80 and 250 sec, measured according to ASTM D4366-95 may be reached.

The method of coating here described provides in air atmosphere coatings that are almost as hard as the one obtainable in inert atmosphere, more specifically the percentage difference of the Konig hardness in air nitrogen and air being equal or less the 15%, preferably equal or less than 10%, more preferably equal or less than 4%.

In the following examples, the preparation of aqueous compositions that can be used as such in the method of the present invention is reported (Compositions C1-C6). The EB curing of the aqueous compositions C1-C6 and of some commercially available radiation curable aqueous compositions in air atmosphere and nitrogen atmosphere, for comparison, has been tested and here below reported.

EXAMPLES

Compositions C1-C6

The aqueous coating composition C1 (35 wt % dry matter, 341 meq/100 g on dry matter of double bonds) contains a physically drying film forming radiation curable polyurethane prepared according to the procedure of Example I of WO2008/084041 from a polycarbonate diol, HMDI (4,4'-methylenebis(cyclohexyl isocyanate)), pentaerythrityl triacrylate (PETIA), dimethylolpropionic acid (DMPA), ethylenediamine, in the presence of methyl ethyl ketone and 6 wt % trimethylolpropane triacrylate (TMPTA).

The Compositions C2-C6 were prepared with the same procedure of C1 but changing the raw materials as follows.
C2: addition of isocyanurate from hexamethylene diisocyanate (10 wt % on prepolymer); 344 meq/100 g dry matter of double bonds
C3: polyester diol instead of polycarbonate diol; 344 meq/100 g dry matter of double bonds
C4: polyether diol instead of polycarbonate diol; 344 meq/100 g dry matter of double bonds
C5: hydroxyethyl acrylate instead of PETIA; 216 meq/100 g dry matter of double bonds
C6: no chain extension, prepolymer capped with dibutylamine.

Application Tests

Example 1

The aqueous compositions C1-C6 and some commercial EB curable coating compositions were laid on the substrate, dried and subsequently cured, in air atmosphere or under a nitrogen blanket (for comparison), by a laboratory scale Electron Beam apparatus. The gap between the Konig hardness of the coating cured in air and inert atmosphere (according to ASTM D4366-95) is an index of the possibility of curing successfully in air atmosphere, Stain resistance of the obtained coatings (coffee, shoes polish and betadine) has also been measured after 4 hours according to UNI EN 12720-1999. Before curing, it was verified whether the coating compositions formed a dust-free or, instead, a dusty film (according to ASTM D1640/D1640M—(2018)). The dustiness or non-dustiness of the films discriminates physically drying, film-forming compositions. The results are reported in Table 1a and 1b.

General Conditions:

| Substrate | glass |
|---|---|
| Layer thickness | 30 g/m$^2$ dry-100 μm wet |
| Drying | 5 min 50° C. (static oven) |
| EB cure settings | 120 kV, 100 kGy, 18 m/min, 10 mm airgap, no N$_2$ |

TABLE 1

Konig Hardness and dustiness

| Composition | Δ% | Hardness (N$_2$) | Hardness (O$_2$) | Dusty |
|---|---|---|---|---|
| C1 | 0 | 193 | 193 | no |
| C2 | 2 | 202 | 197 | no |
| C3 | 5 | 190 | 182 | no |
| C4 | 2 | 186 | 182 | no |
| C5 | −1 | 164 | 165 | no |
| C6 | 5 | 203 | 192 | no |
| LUX 250 | 0 | 199 | 199 | no |
| LUX 399 | 5 | 150 | 143 | no |
| Bayhdrol ®2282 | 7 | 210 | 195 | no |
| Neorad ® R-452 | 9 | 161 | 147 | no |
| Ucecoat ® 7849 | 10 | 129 | 116 | no |
| LUX 220 | 2 | 125 | 122 | no |
| Neorad ® R-570* | 35 | 181 | 116 | yes |

*comparative

Table 1a Legend:
Δ% = percentage difference between the Konig hardness after EB curing under nitrogen and in air atmosphere
Hardness (N$_2$) = Konig hardness (in seconds) after EB curing under nitrogen (for comparison)
Hardness (O$_2$) = Konig hardness (in seconds) after EB curing in air atmosphere TABLE 2a Chemical resistances (after 4 h)

| | Coffee O$_2$/N$_2$ | Shoe polish O$_2$/N$_2$ | Betadine O$_2$/N$_2$ |
|---|---|---|---|
| C1 | 4/4 | 4/5 | 2/3 |
| C2 | 5/5 | 5/5 | 3/3 |
| C3 | 5/5 | 5/5 | 2/3 |
| C4 | 5/5 | 5/5 | 2/3 |
| C5 | 5/5 | 5/5 | 3/3 |
| C6 | 5/5 | 4/5 | 3/3 |
| Bayhdrol ®2282 | 4/5 | 5/5 | 1/1 |
| Neorad ® R-452 | 4/5 | 4/5 | 3/3 |
| Ucecoat ® 7849 | 4/4 | 5/5 | 2/3 |
| Neorad ® R-570* | 3/5 | 2/5 | 2/5 |

*comparative

Table 2a Legend:
Coffee O$_2$/N$_2$ = resistance to coffee stain after EB curing in air atmosphere/after EB curing under nitrogen
Shoe polish O$_2$/N$_2$ = resistance to shoe polish stain after EB curing in air atmosphere/after EB curing under nitrogen
Betadine IPA O$_2$/N$_2$=resistance to betadine stain after EB curing in air atmosphere/after EB curing under nitrogen Commercial Compositions Tested:

LUX 250 (from Alberdingk Boley) is a solvent-free, water based dispersions of a UV curable polyester-polyurethane containing a radiation curable unsaturated reactive diluent, tackfree before cure with from 100 to 600 meq/100 g (dry matter) of radiation curable unsaturated groups.

LUX 220 (from Alberdingk Boley) is a water based dispersions of a polyester-polyurethane that contains along its backbone internal poly-funcional UV reactive segments, tackfree before cure with from 100 to 600 meq/100 g (dry matter) of radiation curable unsaturated groups LUX 399 (from Alberdingk Boley) is a UV-curable polurethane/acrylic copolymer dispersion, tackfree before cure, containing a radiation curable unsaturated reactive diluent, with from 100 to 600 meq/100 g (dry matter) of radiation curable unsaturated groups.

NeoRad™ R452 (from DSM) is water-based urethane/acrylic copolymer dispersion containing a radiation curable unsaturated reactive diluent, tackfree before cure.

NeoRad™ R-570 (from DSM) is a UV curable, aliphatic polyurethane dispersion containing a radiation curable unsaturated reactive diluent with from 100 to 600 meq/100 g (dry matter) of radiation curable unsaturated groups, tacky before cure.

Ucecoat® 7849 (from Allnex) is a radiation curable aliphatic polyurethane dispersion that is tackfree before cure and after water evaporation, with from 100 to 600 meq/100 g (dry matter) of radiation curable unsaturated groups.

Bayhydrol®2282 (from Covestro AG) is a physically drying, waterborne UV-curing polyurethane for coatings, with from 100 to 600 meq/100 g (dry matter) of radiation curable unsaturated groups.

Example 2—Two Layers Coil Coating

General Conditions:

| | |
|---|---|
| Substrate | Aluminum |
| Primer thickness | 5 g/m² dry-24 μm wet |
| Primer drying | 2 min 110° C. (90° C. PMT*), static oven |
| Primer curing | EB, UV |
| EB cure settings | 80 kV, 100 kGy, 15 m/min, 10 mm air gap, no N2 |
| UV cure settings | Hg 160 W/cm 10 m/min |

*PMT = peak metal temperature

The aqueous coating composition C1 was formulated as reported in Table 2, with and without a photoinitiator (F2C1/EB and F2C1/UV). The formulations are respectively laid, dried and subsequently cured, by a laboratory scale Electron Beam apparatus in air atmosphere (F2C1/EB), or under a UV apparatus (F2C1/UV, comparative), to verify the effectiveness of EB curing in air atmosphere. A conventional polyurethane binder that does not need radiation curing was analogously formulated and used for coating)(F2PU/T°. After these primer cycles, a solvent top coat was applied (thickness 25 g/m²) and the coating dried for 1 minute at 420° C. (240° C. PMT). The final coatings were tested for corrosion resistance (salt spray test according to ASTM B117-73), flexibility and adhesion (T bend test according to EN 13523-7:2014), solvent resistance (MEK double rub test according to ASTM D4752-98). The results of the tests are reported in Table 3-5. Overall, the formulation cured by EB in air is comparable to the one cured by UV. Both of them are better in salt spray and MEK resistance than the formulation containing the conventional polyurethane binder.

TABLE 2

| Ingredient | F2PU/T° | F2C1/UV | F2C1/EB | Function & supplier |
|---|---|---|---|---|
| C1 | — | 51.4 | 51.4 | |
| PUD WB (30% d.m.) | 60.0 | — | — | Polyurethane binder from Lamberti SpA |
| Byk 349 | 0.3 | 0.3 | 0.3 | Wetting agent from BYK |

TABLE 2-continued

| Ingredient | F2PU/T° | F2C1/UV | F2C1/EB | Function & supplier |
|---|---|---|---|---|
| Byk 333 | 0.5 | 0.5 | 0.5 | Levelling agent from BYK |
| Viscolam PS 166 10% | 2 | 2 | 2 | Rheology modifier from Lamberti SpA |
| Hexafluorotitanic acid 50% | 1 | — | — | |
| Fluorozirconic acid 50% | 1 | — | — | |
| Rolflex BK18 | 7 | 7 | 7 | Crosslinker from Lamberti SpA |
| Omnirad 500 | — | 1 | — | Photoinitiator from IGM Resins |
| Water | 28.2 | 37.8 | 38.8 | |
| Total | 100 | 100 | 100 | |

TABLE 3

| Formulation/Method | Salt spray 500 h with T-indentation | Salt spray 1000 h with T-indentation |
|---|---|---|
| F2PU/T°* | 4 | 3/4 |
| F2C1/UV* | 5 | 4/5 |
| F2C1/EB | 5 | 4/5 |

*comparative

Rating: best 5-worst 0 considering the dimension, the quantity of the rusting spots and the mm of corrosion from indentation

TABLE 4

| Formulation/Method | MEK double rubs resistance (50 rubs) |
|---|---|
| F2PU/T°* | 3 |
| F2C1/UV* | 4 |
| F2C1/EB | 4 |

*comparative

Rating: 5 best-0 worst considering the film removal

TABLE 5

| Formulation/Method | T Bend test |
|---|---|
| F2PU/T°* | 1 T |
| F2C1/UV* | 1 T/1.5 T |
| F2C1/EB | 1 T |

*comparative

Rating: 1T better-1.5T worse

Example 3—Single Layer, White, Top Coil Coating

General Conditions:

| | |
|---|---|
| Substrate | Aluminum |
| Thickness | 15 g/m2 dry-40 μm wet |
| Drying | 5 min 60° C. (PMT 60° C.), static oven |
| Curing | EB, UV |
| EB cure settings | 100 kV, 100 kGy, 21 m/min, 10 mm airgap, no N2 |
| UV cure settings | Hg 160 W/cm 10 m/min |

The aqueous coating composition C1 was formulated as reported in Table 6, with and without a photoinitiator (F3C1/EB and F3C1/UV).

TABLE 6

| Ingredient | F3PU/T° | F3C1/UV | F3C1/EB | Function & supplier |
|---|---|---|---|---|
| C1 | — | 68.5 | 68.5 | |
| PUD WB1 (30% d.m.) | 68.5 | — | — | Polyurethane binder from Lamberti SpA |
| Byk 349 | 0.3 | 0.25 | 0.25 | Wetting agent from BYK |
| Byk 346 | 0.5 | 0.25 | 0.25 | Wetting agent from BYK |
| Butyldiglycol | 4 | — | — | Cosolvent from Dow Corning |
| Viscolam PS 166 10% | 2 | 2 | 2 | Rheology modifier from Lamberti SpA |
| White paste 75% $TiO_2$ | 20 | 20 | 20 | |
| Water | 4.7 | 6.5 | 9 | |
| Omnirad TPO-L | — | 1 | — | Photoinitiator from IGM Resins |
| Omnirad 819 DW | — | 0.5 | — | Photoinitiator from IGM Resins |
| Omnirad 500 | — | 1 | — | Photoinitiator from IGM Resins |
| Total | 100 | 100 | 100 | |

The formulations are respectively laid, dried and subsequently cured, by a laboratory scale Electron Beam apparatus in air atmosphere (F3C1/EB), or under a UV apparatus (F3C1/UV, comparative), to verify the effectiveness of EB curing in air atmosphere.

A conventional polyurethane binder that does not need radiation curing was analogously formulated and used for coating (F3PU/T°).

The samples are conditioned (7 days, 23° C. and 50% humidity) before testing.

The final coatings were tested for corrosion resistance (salt spray test according to ASTM B117-73), flexibility and adhesion (T bend test according to EN 13523-7:2014), solvent resistance (MEK double rub test according to ASTM D4752-98).

The results of the tests are reported in Tables 7-9

TABLE 7

| Formulation/Method | Salt spray 500 h with T-indentation | Salt spray 1000 h with T-indentation |
|---|---|---|
| F3PU/T°* | 3 | 3 |
| F3C1/UV* | 4 | 4 |
| F3C1/EB | 5 | 4 |

*comparative

Rating: best 5-worst 0 considering the dimension, the quantity of the rusting spots and the mm of corrosion from indentation

TABLE 8

| Formulation/Method | MEK resistance (50 rubs) |
|---|---|
| F3PU/T°* | 1 |
| F3C1/UV* | 5 |
| F3C1/EB | 5 |

*comparative

Rating: 5 best-0 worst considering the film removal

TABLE 9

| Formulation/Method | T Bend test |
|---|---|
| F3PU/T°* | 1.5 T |
| F3C1/UV* | 2 T |
| F3C1/EB | 2 T |

*comparative

Rating: 1.5T better-2T worse

The formulation cured by EB in air is comparable to the one cured by UV. Both of them are much better in salt spray and MEK resistance than the formulation containing the purely thermally cured conventional polyurethane, although a bit more rigid.

Example 4—Single Layer Clear Antifinger Print Coil Coating

General Conditions

| | |
|---|---|
| Substrate | German GL |
| Thickness | 0.9 g/m² dry-4.57 μm wet |
| Drying | 2 min 110° C. (90° C. PMT), static oven |
| EB cure settings | 80 kV, 100 kGy, 15 m/min, 10 mm air gap, no N2 |
| UV cure settings | Hg 160 W/cm 10 m/min |

The aqueous coating composition C1 was formulated as reported in Table 10, with and without a photoinitiator (F4C1/EB and F4C1/UV).

TABLE 10

| Ingredient | F4PU/T° | F4C1/UV | F4C1/EB | Function & supplier |
|---|---|---|---|---|
| C1 | — | 57.2 | 57.2 | |
| PUD WB2 (30% d.m.) | 57.2 | — | — | Polyurethane binder from Lamberti SpA |
| Byk 333 | 0.3 | 0.2 | 0.2 | Levelling agent from BYK |
| Byk 349 | 0.5 | 0.2 | 0.2 | Wetting agent from BYK |
| Sodium nitrite 5% aq. | 3 | 2 | 2 | Anti flush rust additive |
| Viscolam PS 166 10% | 2 | 2 | 2 | Rheology modifier from Lamberti SpA |
| Water | 37 | 37.4 | 38.4 | |
| Omnirad 500 | — | 1 | — | Photoinitiator from IGM Resins |
| total | 100 | 100 | 100 | |

The formulations are respectively laid, dried and subsequently cured, by a laboratory scale Electron Beam apparatus in air atmosphere (F4C1/EB), or under a UV apparatus (F4C1/UV, comparative), to verify the effectiveness of EB curing in air atmosphere.

A conventional polyurethane binder that does not need radiation curing was analogously formulated and used for coating)(F4PU/T°. The samples are conditioned (7 days, 23° C. and 50% humidity) before testing.

The final coatings were tested for corrosion resistance (salt spray test according to ASTM B117-73), alkali resistance (according to an internal method which is a variation of ASTM D870-15, immersion in NaOH 1 wt %—instead of water—at 25° C. for 15 minutes) and solvent resistance (MEK and ethanol double rub test according to ASTM D4752-98).

The results of the tests are reported in Table 11-13

TABLE 11

| Formulation/Method | Salt spray 48 h |
| --- | --- |
| F4PU/T°* | 2 |
| F4C1/UV* | 3 |
| F4C1/EB | 4 |

*comparative

Rating: best 5-worst 0 considering the dimension, the quantity of the rusting spots and the mm of corrosion from indentation

TABLE 12

| Formulation/Method | Alkali resistance |
| --- | --- |
| F4PU/T°* | 1 |
| F4C1/UV* | 3 |
| F4C1/EB | 4 |

*comparative

Rating: best 5-worst 0 considering the blackening of the substrate

TABLE 13

| Formulation/Method | Ethanol double rubs resistance (5 rubs) | MEK double rubs resistance (5 rubs) |
| --- | --- | --- |
| F4PU/T°* | 1 | 1 |
| F4C1/UV* | 4 | 2 |
| F4C1/EB | 4 | 3 |

*comparative

Rating: 5 best-0 worst considering the film removal

The formulation cured by EB in air is better than the one cured by UV. Both of them are much better in salt spray, alkali immersion test and Ethanol and MEK resistance than the formulation containing the conventional polyurethane and thermally cured.

The invention claimed is:

1. Method of coating a substrate comprising the steps of: applying to the substrate from 0.1 to 250 g/m$^2$m$^2$ (dry matter) of a radiation curable aqueous composition comprising from 15 to 50 wt % of a dispersed polymeric binder and from 0 to 15 wt % of an unsaturated reactive diluent;
thermally drying the aqueous composition to form a dust-free film; and
electron beam curing the thermally dried composition, the method being characterized by the fact that the dispersed polymeric binder is a polyurethane binder, the aqueous coating composition is a physically drying, film-forming aqueous composition containing from 100 to 600 meq/100 g (dry matter) of radiation curable unsaturated groups and that the curing is performed in air atmosphere.

2. The method of claim 1 wherein the radiation curable aqueous coating composition comprises from 1 to 10 wt % of the unsaturated reactive diluent.

3. The method of claim 2 wherein the polyurethane binder is prepared by:
reacting from 3 to 10 wt % of a diol containing water dispersing groups;
from 20 to 60 wt % of a nonionic polyether diol, polyester diol, or polycarbonate diol having a molecular weight of from 500 to 5000;
from 10 to 30 wt % of a compound containing one or more groups that are able to react with isocyanate groups and from one to five radiation curable carbon-carbon double bonds;
from 30 to 50 wt % of organic diisocyanates, to obtain a prepolymer containing from 0 to 10 wt % of isocyanate groups;
dispersing the prepolymer in water.

4. The method of coating according to claim 3 wherein the diol contains an anionic or potentially anionic water dispersing group.

5. The method of claim 4 wherein the polyurethane binder contains from 10 to 300 meq/100g of radiation curable carbon-carbon double bonds.

6. The method of coating according to claim 5 wherein the compound containing one or more groups that are able to react with isocyanate groups contains one hydroxyl group and one or three acrylic groups.

7. The method of coating according to claim 6 wherein the compound containing one or more groups that are able to react with isocyanate groups contains one acrylic group.

8. The method of coating according to claim 3 wherein the prepolymer contains from 2 to 6 wt % of isocyanate groups.

9. The method of claim 1 wherein the polyurethane binder is prepared by:
reacting from 3 to 10 wt % of a diol containing water dispersing groups;
from 20 to 60 wt % of a nonionic polyether diol, polyester diol, or polycarbonate diol having a molecular weight of from 500 to 5000;
from 10 to 30 wt % of a compound containing one or more groups that are able to react with isocyanate groups and from one to five radiation curable carbon-carbon double bonds;
from 30 to 50 wt % of organic diisocyanates, to obtain a prepolymer containing from 0 to 10 wt % of isocyanate groups; and
dispersing the prepolymer in water.

10. The method of coating according to claim 9 wherein the diol contains an anionic or potentially anionic water dispersing group.

11. The method of claim 10 wherein the polyurethane binder contains from 10 to 300 meq/100 g of radiation curable carbon-carbon double bonds.

12. The method of coating according to claim 11 wherein the compound containing one or more groups that are able to react with isocyanate groups contains one hydroxyl group and one or three acrylic groups.

13. The method of coating according to claim 12 wherein the compound containing one or more groups that are able to react with isocyanate groups contains one acrylic group.

14. The method of coating according to claim 9 wherein the prepolymer contains from 2 to 6 wt % of isocyanate groups.

15. The method of coating according to claim 14 wherein the prepolymer is chain extended.

16. The method according to claim 1 wherein the substrate is made of glass or metal.

17. The method according to claim 16 wherein the substrate is a metal foil.

18. The method according to claim 1 wherein the substrate is a tridimensional object.

19. The method according to claim 1 wherein the coating composition is a pigmented or coloured composition.

20. The method according to claim 1 wherein the coating composition is an inkjet ink or an overprint varnish.

* * * * *